United States Patent
Benson et al.

(10) Patent No.: US 12,031,195 B2
(45) Date of Patent: Jul. 9, 2024

(54) SYSTEM AND METHOD FOR PRODUCING CRITICAL MINERALS

(71) Applicant: Microbeam Technologies, Inc., Grand Forks, ND (US)

(72) Inventors: Steven Benson, Victoria, MN (US); Alexander Benson, Denver, CO (US)

(73) Assignee: Microbeam Technologies, Inc., Grand Forks, ND (US)

( * ) Notice: Subject to any disclaimer, the term of this patent is extended or adjusted under 35 U.S.C. 154(b) by 0 days.

(21) Appl. No.: 17/812,484

(22) Filed: Jul. 14, 2022

(65) Prior Publication Data

US 2023/0024705 A1      Jan. 26, 2023

Related U.S. Application Data (60) Provisional application No. 63/221,668, filed on Jul. 14, 2021.

(51) Int. Cl.
| | |
|---|---|
| *C22B 41/00* | (2006.01) |
| *C22B 5/12* | (2006.01) |
| *C25C 3/34* | (2006.01) |

(52) U.S. Cl.
CPC ............... *C22B 41/00* (2013.01); *C22B 5/12* (2013.01); *C25C 3/34* (2013.01)

(58) Field of Classification Search
CPC .. C22B 41/00; C22B 5/12; C22B 1/02; C22B 5/16; C22B 7/02; C22B 58/00; C22B 59/00; Y02P 10/20
USPC .......................................................... 75/424
See application file for complete search history.

(56) References Cited

U.S. PATENT DOCUMENTS

| | | | |
|---|---|---|---|
| 7,006,919 B2 | 2/2006 | Osucha et al. | |
| 2007/0274886 A1* | 11/2007 | Benson | C10J 3/84 |
| | | | 423/87 |

FOREIGN PATENT DOCUMENTS

CN          101906542 A    * 12/2010

OTHER PUBLICATIONS

CN-101906542-A Translation (Year: 2010).*
Encyclopaedia Britannica, Germanium, Aug. 2015 (Year: 2015).*
Major, Minor, and Trace Elements, Kentucky Geological Survey Jan. 5, 2023 (Year: 2023).*

* cited by examiner

*Primary Examiner* — Alexandra M Moore
*Assistant Examiner* — Danielle Carda
(74) *Attorney, Agent, or Firm* — DeWitt LLP (57) ABSTRACT

A method of midstream production of Ge and Ga from an REE extraction process is compatible with downstream industrial processes, and may produce Ge and Ga that is 90% pure as oxides, salts, or metals. A method for producing critical minerals includes vaporizing a feedstock comprising the critical minerals; cooling the vaporized feedstock to a condensation temperature of a critical mineral; and capturing the condensed critical mineral. Systems and methods disclosed herein for producing critical minerals are integrated into a rare earth extraction process to co-produce germanium and gallium concentrates.

20 Claims, 5 Drawing Sheets

SYSTEM AND METHOD FOR PRODUCING CRITICAL MINERALS

CROSS REFERENCE TO RELATED APPLICATIONS

This application claims the priority benefit of U.S. Provisional Patent Application Ser. No. 63/221,668, filed Jul. 14, 2021. The entirety of this application is hereby incorporated by reference

FIELD

The present application relates to the field of processing ore and, in particular, to a system and method for producing critical minerals (CM) from coal-based feedstock.

BACKGROUND

The rare earth elements (REE) consist of the lanthanide series of elements with atomic numbers from 57-71. The elements yttrium and scandium may also be categorized as REEs. Due to their unique properties, rare earth elements are crucial materials in a wide variety of applications, from consumer goods to energy system components to military defense applications. It has been discovered that coal feedstocks such as lignite are a viable source of REE. Selected lignite coals are also known to incorporate elevated concentrations of other non-REE critical minerals such as germanium (Ge) and gallium (Ga). Germanium (Ge) and gallium (Ga) are heavily used in renewable energy computing fields, with major markets including solar energy (either as solar cells themselves or components), optical devices and fiber optics, and LEDs, for example.

Lignite coal with concentrations in excess of 25 ppm on a dry-coal basis for individual critical minerals have been identified inside and outside of active mines. This level of concentration means that lignite and lignite-related feedstocks are a worthwhile source for recovering these elements. For example, germanium levels averaging 106 ppm in selected lignite seams have been found in lignites in North Dakota. As another example, the Chinese Ge-ore coal in Wulantuga has concentrations averaging over 150 ppm within seams.

SUMMARY OF THE EMBODIMENTS

Systems and methods disclosed herein provide advanced midstream production of Ge and Ga from a REE extraction process that is compatible with downstream industrial processes, and may produce Ge and Ga that is 90% pure as oxides, salts, or metals. Systems and methods may provide for an integrated process for the recovery of Ge and Ga for a 1-3 tonnes MREE as oxides or salts per day plant that is integrated with downstream manufacturing of products for consumers, clean energy components, and defense applications.

A first aspect of a system and method for producing critical minerals includes vaporizing a feedstock comprising the critical minerals; cooling the vaporized feedstock to a condensation temperature of a critical mineral; and capturing the condensed critical mineral.

A second aspect of a system and method for producing critical minerals is integrated into a rare earth extraction process to co-produce germanium and gallium concentrates.

DETAILED DESCRIPTION OF THE EMBODIMENTS

In embodiments, a system and method for producing critical minerals (CM) includes extracting, separating, recovering and purifying CM from lignite coal-derived rare earth element (REE) concentrates. CMs may include REEs as well as germanium and gallium. Other sources of REE concentrates may also be used that include concentrates derived from various other types of coal, clay-based sediments, and ash materials. The process may be integrated into a rare earth extraction process to co-produce germanium and gallium concentrates. The germanium and gallium process may be compatible with a rare earth element recovery process to separate, concentrate and refine gallium and germanium. In embodiments, the system and method include an integrated development that spans the supply chain, the feedstock sourcing, feedstock optimization, extraction, concentration, separation and refining. Embodiments disclosed herein may include one or several of these processes, in any combination. In some embodiments, the system and method include product use in industrial applications.

Systems and methods disclosed herein may be environmentally benign pyrometallurgical processes for producing 90 to 99 percent pure germanium and gallium oxides, salts or metals from REE concentrates derived from coal or coal-derived ash materials. Additional refining steps may result in critical minerals with a purity of greater than 99%. The method and apparatus include a multi-step roasting process, in which reducing gases, followed by oxidizing gases, volatilize the Ge/Ga mixture (reducing) and subsequently oxidize/calcine the REE oxalates to oxides (oxidizing).

Figure 1:
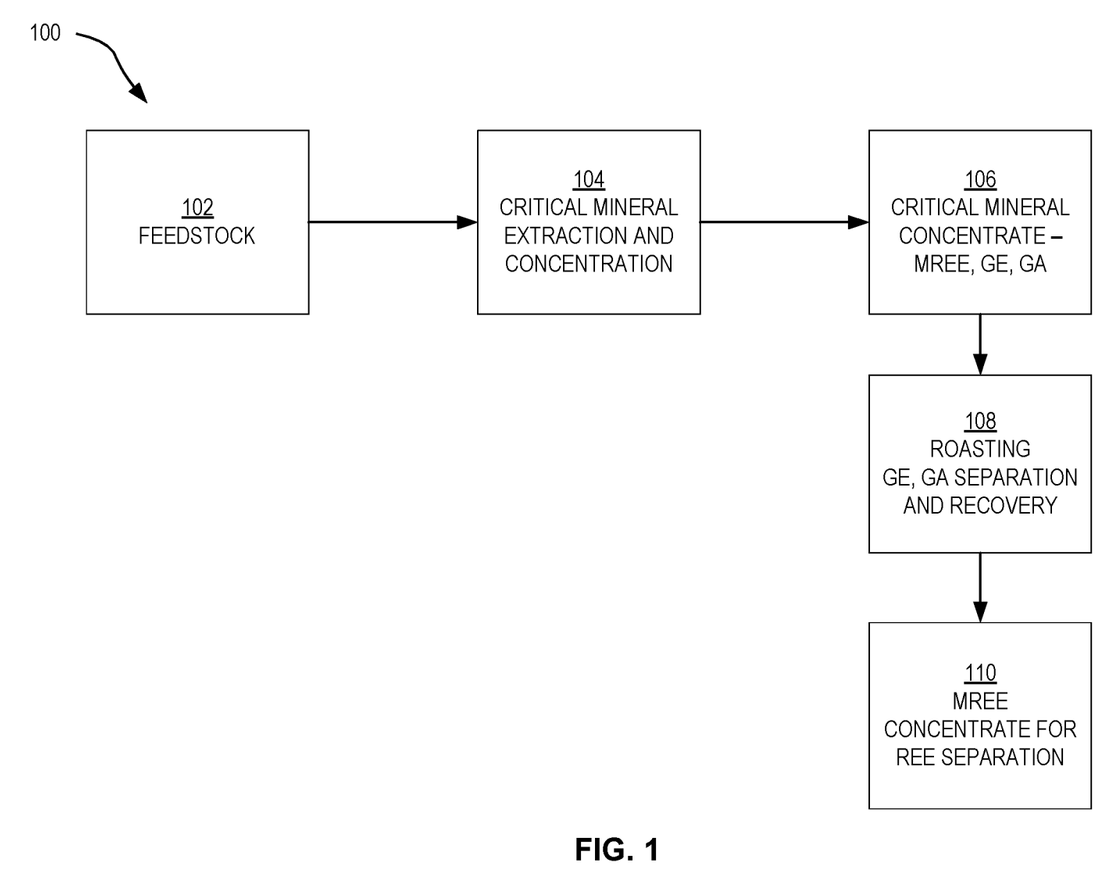
FIG. 1 is a schematic diagram of a system and method for co-producing an REE concentrate and critical minerals, in embodiments.

FIG. 1 is a schematic diagram of a method 10 for producing critical minerals, in embodiments. In embodiments, method 10 may be understood as an REE extraction and concentrating process.

REE extraction and concentrating method 10 includes several representative steps for purposes of illustration but is not limited to these specific steps. Additional steps not shown in FIG. 1 may be included. The steps depicted in FIG. 1 may be combined with each other or with other steps not shown.

Method 10 begins with feedstock 102, which may be lignite coal with a representative REE content. In embodiments, feedstock 102 may be crushed and screened. The concentration of REEs in feedstock 102 may be determined in a variety of ways and a representative total REE content in the form of an oxide or carbonate may range from 10 to 5000 ppm depending on the type of extraction and recovery process.

Critical mineral extraction and concentration 104 may include steps such as specific gravity separation, which removes heavy mineral content as well as iron. Additional steps may include a leaching process to remove impurities (alkali and alkaline earth elements, iron, etc.) as well as dewatering and purification steps to provide a critical mineral concentrate solution 106. In embodiments, concentrate solution may have a concentration of Ge and Ga of greater than 0.2% Ge and Ga.

Roasting step 108 under controlled conditions vaporizes volatile components such as ash and germanium. Condensation is then performed at selected temperatures for recovery. In embodiments, germanium-rich ash materials accumulate in deposits collected on heat exchange surfaces at temperatures below 1250° F. (677° C.). The deposits consist of layers of Ge-rich materials range from 50 to 90% Ge. X-ray diffraction analysis identifies that the crystalline forms of Ge to be $GeO_2$ and elemental Ge. Typically, coal feedstock 102 may contain only 5-ppm germanium. The high levels of Ge in the syngas cooler deposits may be due to recycling of char from gas filter hoppers (not shown) to the first stage of the gasifier that would revaporize the Ge, resulting in increased levels in the syngas and accumulation in the syngas cooler. Syngas is used as a feedstock for a process for producing critical minerals such as Ge and Ga, as shown in more detail in FIG. 2.

Germanium is present in varying levels in U.S. coals. These levels may be as high as 819 ppm. At high temperatures, the germanium vaporizes and remains in the vapor phase until it condenses at temperatures below 1250° F. (677° C.). Upon condensation, vapor phase germanium species form small particles and are transported to the heat transfer surface with other entrained particles by diffusion, thermophoresis, and inertial impaction. Components that stick and form deposits consist of condensed vapor phase materials with minor amounts of entrained ash particles. MREE concentrate 110 has had the volatile elements such as Ge and Ga removed and is available for REE separation and purification.

The transformations of Ge are like the pyrometallurgy processes used in recovering Ge from ores that involve vaporization, condensation, and recovery of Ge as a sulfide or oxide. The sulfides/oxides can then be chlorinated to $GeCl_4$, followed by hydrolysis to produce $GeO_2$. The $GeO_2$ can be reduced by heating in a hydrogen gas ($H_2$) to produce germanium metal.

Figure 2:
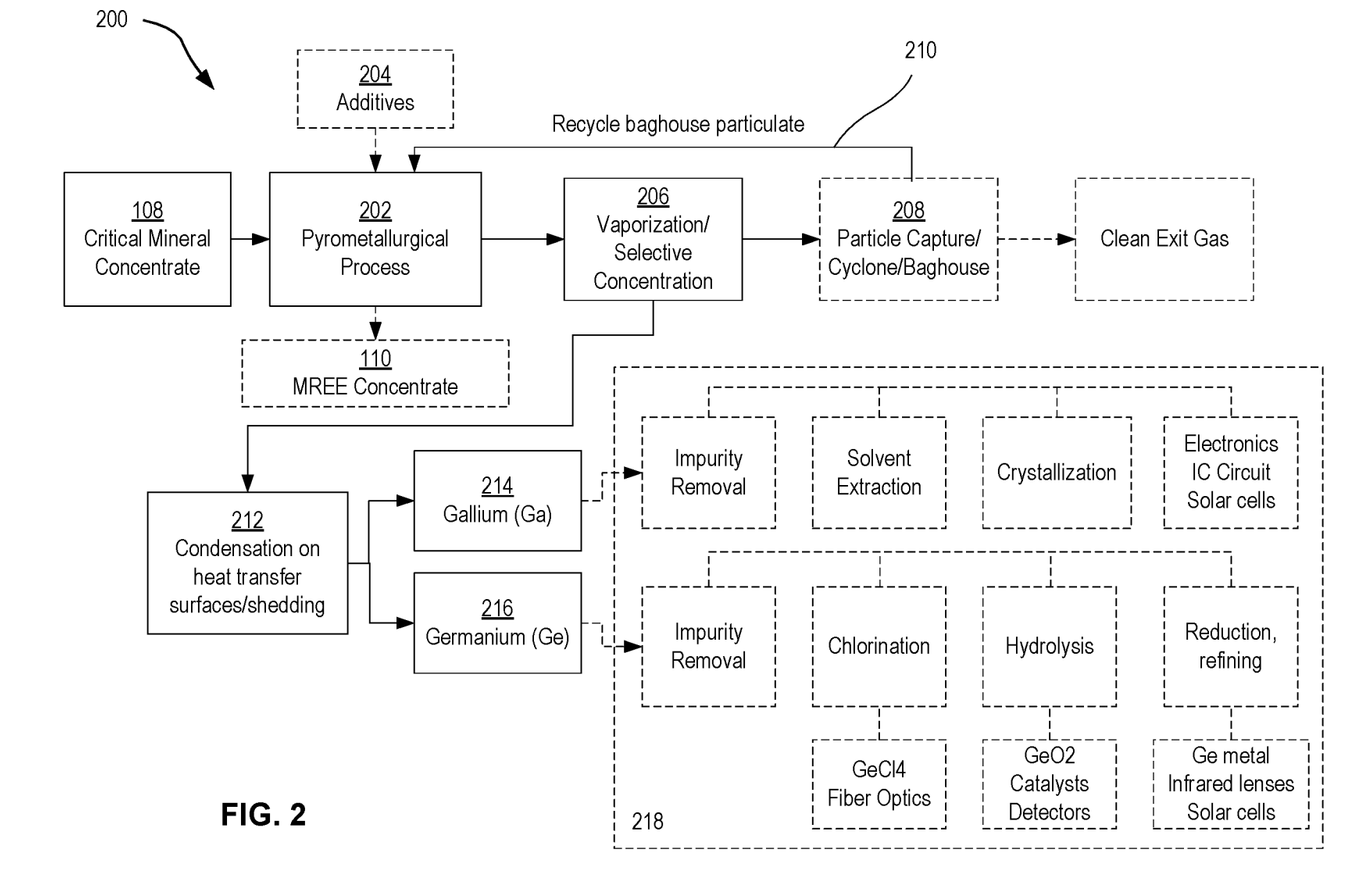
FIG. 2 is a schematic diagram of a system of recovering critical minerals from an REE concentrate, in embodiments.

FIG. 2 is a schematic diagram of a method 200 to recover Ge and Ga from a critical mineral concentrate 106 in embodiments. Method 200 includes several representative steps for purposes of illustration but is not limited to these specific steps. Additional steps not shown in FIG. 2 may be included. The steps depicted in FIG. 2 may be combined with each other or with other steps not shown. In embodiments, method 200 may be incorporated into coal processing facility for producing energy or other products.

Method 200 begins with critical mineral concentrate 108 from FIG. 1. Method 200 includes steps 202, 206, 212, 214 and 216. In embodiments, method 200 also includes at least one of steps 204, 208, 210 and 218. In embodiments, method 200 is an expanded method of roasting step 108.

Step 202 includes a pyrometallurgical process. In an example of step 202, the process may include calcination, roasting or any heating process that raises the temperature of concentrate 108 to a temperature between 800° C. and 1100° C., or a temperature high enough to produce a reducing environment to enhance subsequent steps. In embodiments, various additives 204 such as reductant CO, may be added in step 202 to assist the pyrometallurgical process.

Step 206 includes vaporization. In an example of step 206, the product of step 202 may be subjected to a vaporization and/or selective concentration process. The condensation temperature of Ge and Ga metal may be predicted for an MREE (medium REE) concentrate composition in a reducing gas environment as input to an equilibrium thermodynamic model. In embodiments, the condensation temperature may be approximately 1250° F. (677° C.) for Ge metal and approximately 1600° F. (871° C.) for Ga metal. The method of FIG. 2 takes advantage of varied condensation behavior to selectively condense out elements.

Step 208 includes a particle capture process. In an example of step 208, particle capture may be performed by a cyclone or baghouse as part of a coal-fired processing facility. In embodiments, step 208 includes a recycle loop 210 to recover any Ge and Ga that was not captured by the heat exchanges and send it back to step 202. In addition, the ability to recycle the particulate materials captured downstream can be used to increase the recovery efficiency of the Ga and Ge. Recycle loop 210 may result in the accumulation of deposits rich in Ge with levels up to approximately 90% GeO and Ge.

Step 212 includes condensation and accumulation on heat transfer surfaces. In an example of step 212, accumulation of Ge and Ga rich materials on heat transfer surfaces that can be shed from the steel surface through thermal shocking or cleaning processes causing shedding. The materials that shed from the surface are accumulated in a hopper and available for purification. Step 212 provides for the separation of Ge and Ga through selective condensation processes and capture on cooled steel surfaces that allow for the capture of heat, making the process more efficient. Condensation step 212 results in gallium 214 and germanium 216.

Each of these elements may be further processed in a variety of ways as shown, for example, in box 218. These additional processes may further separation to >90% pure by use of the chloride boiling points found for each element (83° C. and 204° C. for Ge and Ga, respectively) allows for separation from any other volatile materials selectively condensed with the metals previously. This pyro-metallurgy process, more akin to distillation without the expected need for multiple equilibrium stages, may generate up to 99% pure material. Final reduction to the metallic state follows, enabling an expected 99.99% pure material. Reduction to Ge metal, due to the semiconducting nature of the metal, is required by use of a reducing gas (rather than electrowinning), whereas Ga metal may be produced by molten salt electrolysis directly from the halide salt (at a temperature around 80° C.). Some of the end uses for Ge and Ga include integrated circuits, solar cells, fiber optics, catalysts, detectors and infrared lenses, for example.

The system and method described herein allows for low-cost generation of high-purity Ge/Ga concentrates (~50%) that don't include common contaminants and may be generated from other conventional processes due to the nature of preliminary concentration (in the REE plant). The system and method use low-cost and environmentally friendly pathways for final separation and reduction of metal. In embodiments, coal sources available to a 1-3 tonnes per day coal-fired processing plant including REE concentrate systems and methods as disclosed herein may produce Ge quantities in excess of 10% of the US requirement (coal analysis of 15-25 ppm Ge whole coal basis for lignite coals within active mines and other high-interest coal seams).

Figure 3:
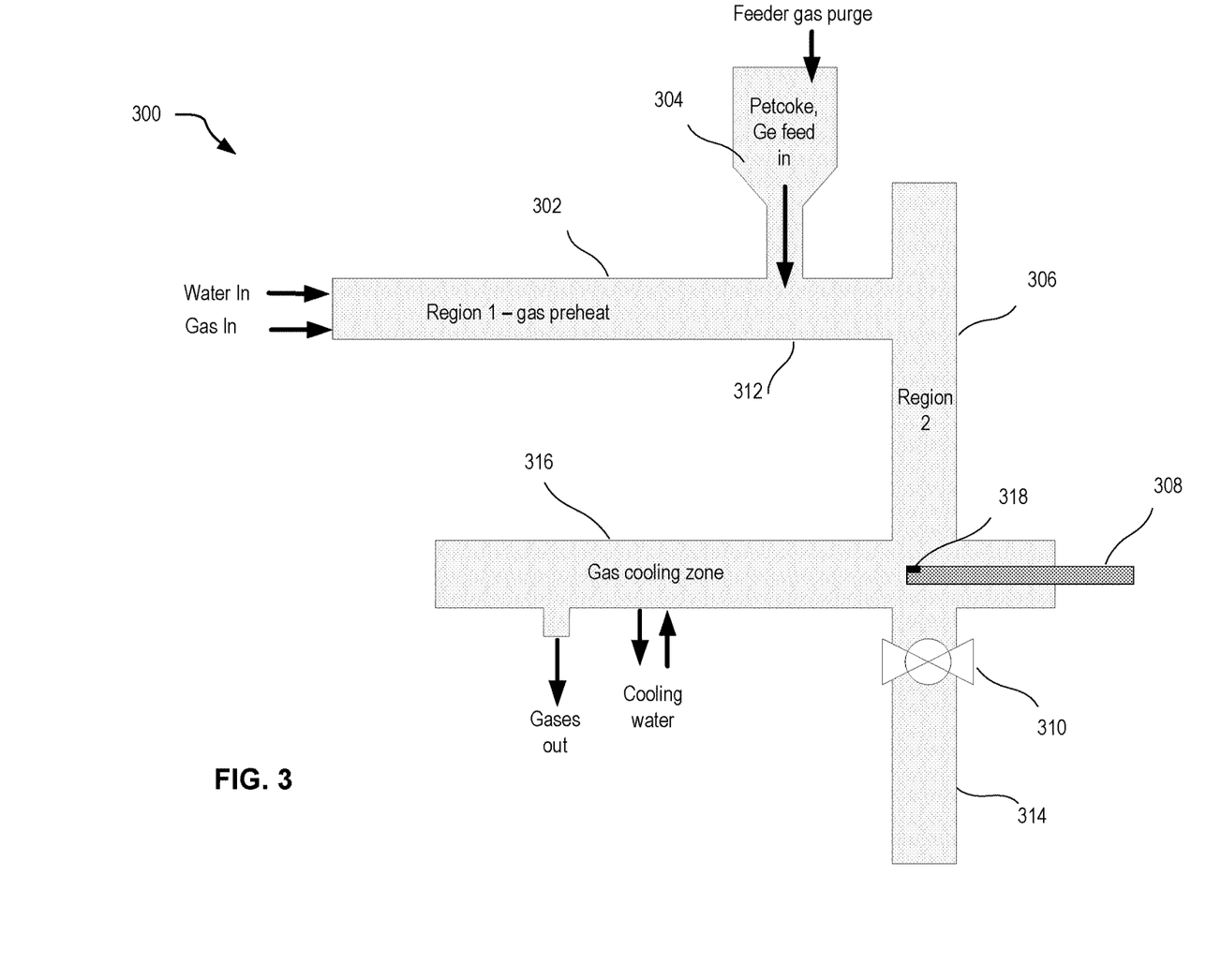
FIG. 3 is a schematic diagram of a system to recover Ge-rich materials from ash materials, in embodiments.

FIG. 3 is a schematic diagram of a laboratory-scale prototype system 300 to recover Ge-rich materials from ash materials. FIG. 3 illustrates general principles of systems and methods disclosed herein but other arrangements of apparatus that accomplish the same processing steps may be used. For example, regions of heating and cooling may have different spatial arrangements or be integrated with other apparatus. Physical orientations are described below but other physical orientations may be used.

System 300 includes of a generally horizontal furnace section 302 (Region 1) to preheat gas and vaporize germanium. A feed system 304 is located near the end of the horizontal furnace section 302. Feed system 304 provides syngas from roasting step 108 of FIG. 1 and a reductant, for example, petcoke, hydrogen or carbon monoxide. A reductant may be an example of additive 204 of FIG. 2.

From feed zone 312, vaporized Ge-rich materials travel to a generally vertical furnace section 306 (Region 2) to provide fine control of gas temperature and descend to water-mist- and air-cooled sampling probe 308 and test coupon 318 to provide a cooled surface to enhance condensation. A lock hopper 310 and materials-accumulation zone 314 are located below sampling probe 308. Materials (germanium and other volatile components) condensed on probe 318 are spalled from the surface using thermal cycling and collected in materials-accumulation zone 314. From Region 2, vaporized materials travel to gas cooling zone 316 for further processing. For example, the temperature of the gases may be lowered with cooling water.

Figure 4A:
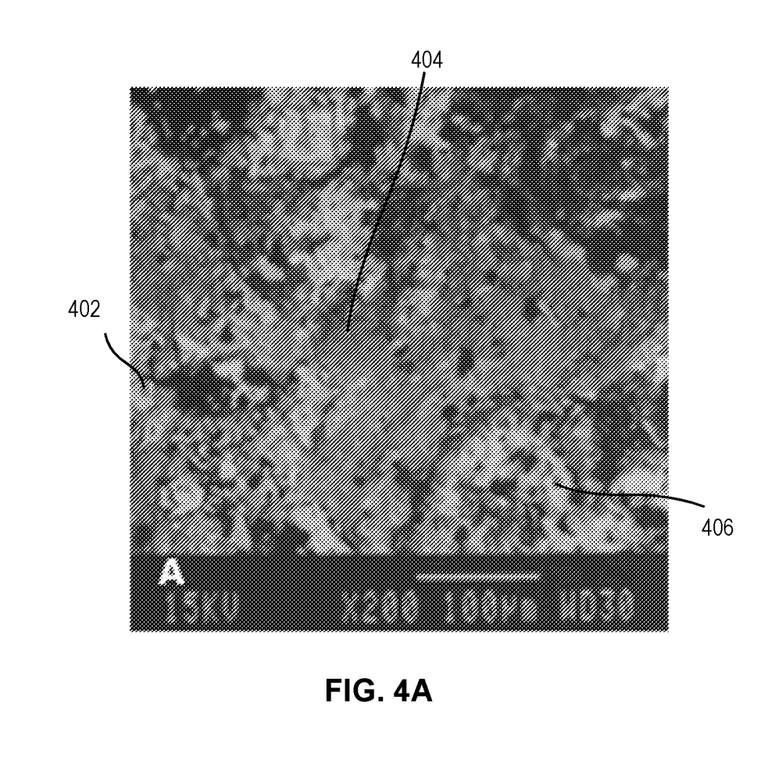
FIG. 4A shows a SEM image (backscattered electron image (BEI)) of coupon ash material, in embodiments.
Figure 4B:
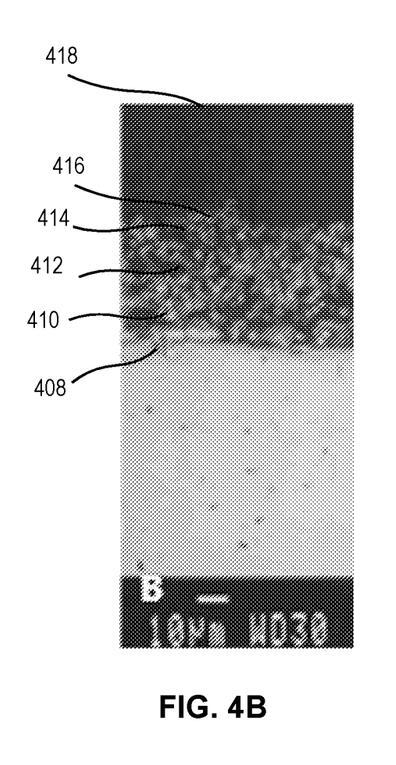
FIG. 4B shows the probe film layer of FIG. 4A, in embodiments.
Figure 4C:
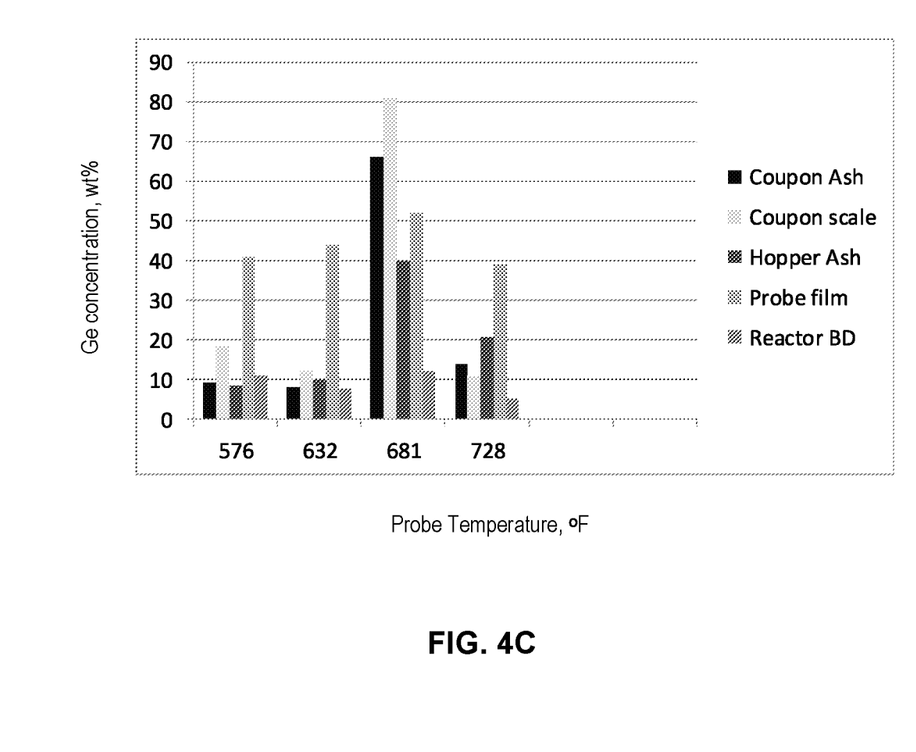
FIG. 4C is a graph showing an average abundance of Ge in samples from various materials, in embodiments.

The degree of vaporization of germanium may be a function of temperature, gas composition (reducing environments), and system pressure. At low pressures, approximately 70% of the germanium may be vaporized from Ge-containing feedstocks (ash and model compounds). FIGS. 4A-4C illustrate results from testing conducted by vaporizing Ge and condensing it downstream on a cooled probe during 2-hour test feeding Ge-rich ash materials with a syngas atmosphere of 36.5% $H_2$ with CO. FIG. 4A shows a SEM image (backscattered electron image (BEI)) of coupon ash material and FIG. 4B shows a film layer on probe 308. FIG. 4C is a graph showing the influence of probe coupon temperature on the abundance of Ge in samples collected from the system including coupon ash, coupon scale, hopper ash, and reactor blow down (BD). FIGS. 4A, 4B and 4C are best viewed together in the following discussion.

The temperature of the steel surface of the probe as well as the gas temperature has an influence on the abundance and composition of the materials accumulated. A probe temperature of about 680° C. produces deposits and hopper ash materials with the highest levels of Ge. This is consistent with the calculations that estimated the onset of condensation to be about 670° C. In a representative example, the composition of the coupon ash and the coupon film in FIGS. 4A and B, respectively, is summarized in Table 1. The composition deposit is mainly Ge, S and O with minor amounts of Fe.

TABLE 1

Coupon ash and deposit cross-section analysis of FIGS. 4A and 4B, respectively. All values are listed in weight percent components and measured in the SEM using an energy dispersive X-ray detector.

|  | Point # | Description | S | Cr | Fe | Ni | Ge | O |
|---|---|---|---|---|---|---|---|---|
| FIG. 4A | 402 | Overall @200x | 5.89 | 0.00 | 0.00 | 0.00 | 74.97 | 17.12 |
|  | 404 | Overall @200x | 5.66 | 0.38 | 0.00 | 0.00 | 77.16 | 14.09 |
|  | 406 | Light material | 19.18 | 0.00 | 2.43 | 0.00 | 59.89 | 11.29 |
| FIG. 4B | 408 | Steel | 0.41 | 18.02 | 67.67 | 6.87 | 3.45 | 0.00 |
|  | 410 | Inner layer | 14.58 | 1.90 | 5.90 | 2.29 | 73.62 | 0.00 |
|  | 412 | Middle layer | 6.330 | 0.00 | 0.00 | 0.00 | 80.83 | 11.83 |
|  | 414 | Middle layer | 11.56 | 0.31 | 1.48 | 0.79 | 80.53 | 5.32 |
|  | 416 | Outer layer | 14.70 | 0.00 | 0.98 | 0.00 | 83.32 | 0.00 |
|  | 418 | Outer layer | 9.69 | 0.56 | 0.69 | 0.00 | 87.43 | 0.00 |

Following initial separation from the REE concentrates, concentrated Ge/Ga substrates in excess of 50% pure may be anticipated. The system and method disclosed herein recovers Ge/Ga from midstream REE concentrates produced from an REE process followed by purification, and reduction to form high purity metals.

In embodiments, the system and method may be provided in a variety of ways. For purposes of illustration, a representative process is provided below.

Systems and methods disclosed herein may be incorporated in a coal-fired processing plant within existing equipment. Further, parameters may be determined by an analysis of thermodynamic data on condensation and subsequent halide conversion utilizing a variety of modeling platforms, such as a thermochemical equilibrium model (FactSage®). In further embodiments, a process flow diagram may be quantified with specific critical mineral recovery rates, including Ge and Ga, and identification of logical off-take points within the processing chain may be identified (either as providing a product of a 90+% pure concentrate to a refiner, or direct refining to 99.99%+purity metals).

Systems and methods for REE recovery simultaneously concentrate these critical minerals from the lignite sources, providing cost-effective production of these germanium and gallium, as well as other critical minerals, with minimal additional cost over REE production. The implementation takes advantage of the unique similarities between these critical mineral associations and allows for considerably lower refining costs than conventional options as a result. Ge and Ga are heavily used in renewable energy computing fields, with major markets of each including solar energy (either as cells themselves or components), optical devices and fiber optics, and LEDs. Lignites with concentrations in excess of 25 ppm on a whole-coal basis for each critical mineral have been identified inside and outside of active mines, making these elements easily recoverable from lignite in significant quantities.

An environmentally benign system and method to produce Ge and Ga may be fully integrated with downstream uses and with the properties of the MREO/MRES properties. The system and method may include the characterization of midstream feedstocks as well as potential lignite feedstocks.

Feedstock Identification and Characterization—Midstream REE concentrates may be characterized in detail to determine the abundance and forms of Ge and Ga. The samples may be characterized using ICP-MS or ICP-OES to determine the abundance of critical materials that includes all REE, Ge, Ga, Mo, Sc, and Y. X-ray diffraction may be used to identify any crystalline phases. In addition, scanning electron microscopy and x-ray microanalysis may be performed to examine microstructure and determine the composition of selected features that can be used to ascertain associations of elements. Coal mines may identify feedstocks that are rich in Ge and Ga. A set of Ge/Ga volatilization tests of REE concentrates may be performed.

In embodiments, a system and method for Ge and Ga recovery may have several benefits over existing Ge/Ga recovery and separation from ores, including: 1) Integration of the volatilization of the Ge/Ga materials within existing roasting procedures, essentially eliminating the energy penalty (as already paid by the REE facility). Roasting of the REE is anticipated at a higher temperature than Ge/Ga requirements, preventing cost, 2) Removal of solvent and/or aqueous-based systems for final Ge/Ga purification. This drastically reduces the potential environmental footprint of the proposed addition, and the reducing gases utilized may be from fossil and/or renewable (solar/wind $H_2$) sources, and 3) Ge/Ga separation, while difficult by solvent separation (requiring considerable staging) is relatively easy by high-temperature condensation, as chosen as the first form of separation.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method of producing critical minerals, the method comprising:
   providing a rare earth element (REE) concentrate feedstock comprising one or more critical minerals, wherein the one or more critical minerals comprises germanium (Ge), gallium (Ga), or a combination thereof;
   vaporizing the one or more critical minerals in the REE concentrate feedstock at a vaporization temperature to provide the one or more critical minerals as a vaporized feedstock;
   condensing the vaporized feedstock on at least one heat transfer surface at a condensation temperature to accumulate one or more critical mineral condensates, wherein the condensation temperature being less than the vaporization temperature, and wherein the one or more critical mineral condensates comprises germanium (Ge), gallium (Ga), or a combination thereof; and
   capturing the one or more critical mineral condensates, wherein each of the one or more critical mineral condensates has a purity of at least 50%.

2. The method of claim 1, wherein the REE concentrate feedstock is derived from coal or coal-derived ash materials.

3. The method of claim 1, wherein the one or more critical minerals is germanium (Ge), the one or more condensed critical minerals is condensed germanium (Ge), the one or more critical mineral condensates is germanium (Ge), and the condensation temperature is below approximately 1250° F. (677° C.).

4. The method of claim 3, further comprising chlorination of the germanium (Ge) condensate to provide a chlorinated germanium having formula $GeCl_4$ using a chloride boiling point of 83° C.

5. The method of claim 4, further comprising hydrolysis of the chlorinated germanium to provide germanium dioxide ($GeO_2$).

6. The method of claim 5, further comprising reduction of germanium dioxide ($GeO_2$) using a reducing gas to provide germanium metal.

7. The method of claim 1, wherein the one or more critical minerals is gallium (Ga), the one or more condensed critical minerals is condensed gallium (Ga), the one or more critical mineral condensates is gallium (Ga), and the condensation temperature is below approximately 1600° F. (871° C.).

8. The method of claim 7, further comprising chlorination of the gallium (Ga) condensate to provide a chlorinated gallium using a chloride boiling point of approximately 204° C.

9. The method of claim 8, further comprising molten salt electrolysis of the chlorinated gallium at a temperature of approximately 80° C. to provide gallium metal.

10. The method of claim 9, further comprising crystallization.

11. The method of claim 1, wherein the REE concentrate feedstock has a concentration of germanium (Ge) of greater than 0.2%.

12. The method of claim 1, wherein the REE concentrate feedstock has a concentration of gallium (G) of greater than 0.2%.

13. The method of claim 1, wherein the vaporization temperature is greater than 1600° F. (871° C.).

14. The method of claim 1, wherein the one or more critical minerals of the REE concentrate feedstock is germanium (Ge) and gallium (Ga), wherein the step of condensing the vaporized feedstock comprises a first heat transfer surface at a first condensation temperature to accumulate a first critical mineral condensate comprising gallium (Ga), and wherein the step of condensing the vaporized feedstock comprises a second heat transfer surface at a second condensation temperature to accumulate a second critical mineral condensate comprising germanium (Ge).

15. The method of claim 14, wherein the vaporization temperature is greater than the first condensation temperature.

16. The method of claim 15, wherein the second condensation temperature is approximately 1250° F. (677° C.).

17. The method of claim 14, wherein the first condensation temperature is between the vaporization temperature and the second condensation temperature.

18. The method of claim 14, wherein the first condensation temperature is approximately 1600° F. (871° C.).

19. The method of claim 1, wherein each of the one or more critical mineral condensates has a purity of at least 90%.

20. The method of claim 1, wherein the step of capturing the one or more critical mineral condensates comprises shedding the one or more critical mineral condensates accumulated on the at least one heat transfer surface into a collection apparatus.

\* \* \* \* \*